United States Patent
Suda et al.

(10) Patent No.: US 6,847,707 B1
(45) Date of Patent: Jan. 25, 2005

(54) COMMUNICATION CHARGE CALCULATING APPARATUS, CONTROL METHOD FOR THE SAME, AND MEDIUM IN WHICH PROGRAM FOR THE COMMUNICATION CHARGE CALCULATING APPARATUS HAS BEEN RECORDED

(75) Inventors: Shinichiro Suda, Tokyo (JP); Tatsuo Suzuki, Toyokawa (JP); Tomoharu Ikedo, Aichi (JP); Katsutoshi Gomyo, Gifu (JP)

(73) Assignee: NTT Comware Corporation, Tokyo (JP)

(*) Notice: Subject to any disclaimer, the term of this patent is extended or adjusted under 35 U.S.C. 154(b) by 234 days.

(21) Appl. No.: 10/110,750
(22) PCT Filed: Sep. 6, 2000
(86) PCT No.: PCT/JP00/06030
§ 371 (c)(1),
(2), (4) Date: Apr. 12, 2002
(87) PCT Pub. No.: WO01/28217
PCT Pub. Date: Apr. 19, 2001

(30) Foreign Application Priority Data

Oct. 13, 1999 (JP) .......................................... 11-291458

(51) Int. Cl.[7] .......................................... H04M 15/00
(52) U.S. Cl. .............................. 379/114.01; 379/115.03; 379/114.28; 379/114.02; 379/114.03
(58) Field of Search ....................... 379/112.01, 112.07, 379/112.08, 114.01, 114.02, 114.03, 114.28, 115.01, 115.02, 115.03, 121.01, 133, 134, 32.01, 32.02, 32.05

(56) References Cited

U.S. PATENT DOCUMENTS

| | | | | |
|---|---|---|---|---|
| 5,163,042 A | * | 11/1992 | Ochiai | 370/238 |
| 5,185,785 A | * | 2/1993 | Funk et al. | 379/111 |
| 5,392,344 A | | 2/1995 | Ash et al. | |
| 5,550,912 A | * | 8/1996 | Akinpelu et al. | 379/221.02 |
| 6,137,876 A | * | 10/2000 | Wong et al. | 379/246 |
| 6,173,051 B1 | * | 1/2001 | Lipchock et al. | 379/220.01 |

FOREIGN PATENT DOCUMENTS

| | | |
|---|---|---|
| JP | 62-200859 | 9/1987 |
| JP | 1-115260 | 5/1989 |
| JP | 4-239257 | 8/1992 |
| JP | 6-326792 | 11/1994 |
| JP | 7-170327 | 7/1995 |
| JP | 7-212503 | 8/1995 |
| JP | 8-195835 | 7/1996 |
| JP | 9-261337 | 10/1997 |
| JP | 2000-278450 | 10/2000 |
| JP | 2000-332750 | 11/2000 |

* cited by examiner

Primary Examiner—Quoc Tran
(74) Attorney, Agent, or Firm—Brinks Hofer Gilson & Lione

(57) ABSTRACT

A model reader reads out provider models from a provider model file on the basis of the types of carriers read out by a type reader. A module reader reads out, in units of planes, charge calculation modules that provide settlement items uniquely set for each carrier from a charge calculation module file. A communication charge calculator calculates a communication charge according to the module that has been read from the module file on the basis of a charge calculation module.

12 Claims, 12 Drawing Sheets

FIG. 6

| MODULE NUMBER | MODULE NAME | MODULE |
|---|---|---|
| A01 | SETTING OF TRANSMITTER/ RECEIVER CLASSIFICATION | xxxxxx |
| A02 | SETTING OF SERVICE INFORMATION | xxxxxx |
| A03 | SETTING OF PHS CLASSIFICATION | xxxxxx |
| A04 | SETTING OF INSIDE/ OUTSIDE ZA | xxxxxx |
| ⋮ | ⋮ | ⋮ |

FIG. 7

| | | | |
|---|---|---|---|
| 21n | CALL UNITS | XXXX | . . . |
| 21m | COMMUNICATION TIME | XXXX | . . . |
| 21l | NUMBER OF COMMUNICATIONS | XXXX | . . . |
| 21k | DISTANCE STEP | XXXX | . . . |
| 21j | CA CODE | XXXX | . . . |
| 21i | POI CODE | XXXX | . . . |
| 21h | INSIDE/OUTSIDE GA DISCRIMINATOR | XXXX | . . . |
| 21g | INSIDE/OUTSIDE ZA DISCRIMINATOR | XXXX | . . . |
| 21f | SERVICE CLASSIFICATION | XXXX | . . . |
| 21e | SETTLEMENT SERVICE CLASSIFICATION | XXXX | . . . |
| 21d | TRANSMITTER/ RECEIVER CLASSIFICATION | XXXX | . . . |
| 21c | CHARGING/ INQUIRING DISCRIMINATOR | XXXX | . . . |
| 21b | CONNECTION PATTERN | XXXX | . . . |
| 21a | CARRIER IDENTIFICATION CODE | XXXX | . . . |

COMMUNICATION CHARGE CALCULATING APPARATUS, CONTROL METHOD FOR THE SAME, AND MEDIUM IN WHICH PROGRAM FOR THE COMMUNICATION CHARGE CALCULATING APPARATUS HAS BEEN RECORDED

RELATED APPLICATIONS

This application is the National Stage of International Application No. PCT/JP00/06030, filed Sep. 6, 2000, which claims priority to Japanese Application No. 11-291458, filed Oct. 13, 1999.

TECHNICAL FIELD

The present invention relates to a communication charge calculating apparatus, a control method for the same, and a medium in which a program for the same has been recorded, and more particularly, to the calculation of charges billed by one particular carrier to all other carriers when communication is effected by interconnecting a plurality of carriers.

BACKGROUND ART

In recent years, in the communication performed by interconnecting a plurality of carriers (hereinafter referred as "interconnect communication"), new interconnect forms or settlement methods are being devised as new carriers enter the market or new communication services are created.

As a rule, the settlement among carriers that occurs when the interconnect communication is performed and that involves the charges for using facilities has been effected only among the carriers directly connected. Hence, no transfer of charges is carried out among the carriers indirectly connected except for special occasions.

This will be specifically explained, taking as an example, a case where a message is transmitted using the line facilities of a first carrier and goes through line facilities of a second carrier and a third carrier in turn and reaches a receiver.

In this case, the first carrier is entitled to bill the transmitter for the communication charge. The second carrier is entitled to bill the first carrier for having used its line facilities. The third carrier is entitled to bill the first carrier and the second carrier, respectively, for having used its line facilities. Although the third carrier can recognize that the second carrier has used their line facilities, the third carrier has difficulties to recognize that the first carrier has also used their line facilities.

Therefore, since the third carrier cannot fully recognize the communication, they can bill only the second carrier for having used their line facilities, and they cannot bill the first carrier for having used their line facilities.

Furthermore, recent interconnect forms and settlement methods are usually more complicated than existing interconnect forms and settlement methods. Accordingly, there has been a demand for apparatuses that are able to quickly and flexibly cope with such interconnect forms or settlement methods.

DISCLOSURE OF INVENTION

The present invention provides a communication charge calculating apparatus, a control method therefore, and a medium in which a program for the communication charge calculating apparatus has been recorded that make it possible to keep track of all carriers involved in a communication between a transmitter and a receiver so as to accurately grasp the settlement information generated among the carriers.

According to one mode of the present invention, a communication charge calculating apparatus for calculating communication charges between carriers generated as a result of communication via communication facilities of a plurality of carriers comprises a combination extracting section for extracting a combination of two carriers, for which a communication charge is to be calculated, on the basis of connection-order types-information, the types-information concerning a line-up of carriers in a connection order between a transmitter and a receiver in communication, and a communication charge calculating section for calculating the communication charge between the carriers in each combination on the basis of all combinations of carriers extracted in the combination extracting section and the connection-order types-information.

The types information may be determined on the basis of the carrier identification information included in paging information in communication.

The combination extracting section may comprise a calculation combination file for storing the connection-order types-information and combinations of carriers in the connection-order types-information, and a combination readout section for reading out combinations of carriers from the calculation combination file on the basis of the types identification information about the carriers involved in communication.

The combination of carriers may be a combination of an invoicing carrier that charges a communication charge and an invoiced carrier that is charged for the communication charge.

The communication charge calculating section may calculate a communication charge on the basis of a processing procedure predefined for each combination of carriers.

The communication charge calculating section may comprise a charge calculation processing procedure file for storing combinations of carriers and the processing procedures for each combination of carriers, and a processing procedure readout section for reading the processing procedures from the charge calculation processing procedure file on the basis of a combination of carriers.

The processing procedures may correspond to program modules describing the procedures for calculating communication charges.

According to another mode of the present invention, a control method for a communication charge calculating apparatus that calculates communication charges between carriers generated as a result of communication via communication facilities of a plurality of carriers comprises a combination extracting step for extracting a combination of two carriers, for which a communication charge is to be calculated, on the basis of connection-order types-information, the types-information concerning a line-up of type of carriers in a connection order between a transmitter and a receiver in communication, and a communication charge calculating step for calculating a communication charge between the carriers in each combination on the basis of all combinations and the connection-order types-information.

According to yet another mode of the present invention, a medium, in which a program for calculating communication charges between carriers generated as a result of communication via communication facilities of a plurality of carriers has been recorded, records a program for extracting a combination of two carriers, for which a communication charge is to be calculated, on the basis of connection-order types-information, the types-information concerning a line-up of types of carriers in connection order between a transmitter and a receiver in communication, and for calculating a communication charge for each combination of carriers on the basis of all the extracted combinations of carriers and the connection-order types-information.

BRIEF DESCRIPTION OF THE DRAWINGS

FIG. 6 is a diagram showing a file configuration of a module file shown in FIG. 1.

FIG. 7 is a diagram showing a file configuration of a carrier settlement information file shown in FIG. 1.

BEST MODE FOR CARRYING OUT THE INVENTION

[1] Configuration of Embodiment
[1.1] Principle of the Communication Charge Calculating Apparatus First, a communication charge calculating apparatus according to an embodiment of the present invention classifies all interconnection modes into two types on the basis of types of carriers, as described later, in order to calculate communication charges of the communication effected through communication facilities of a plurality of carriers.

The types of carriers include, for example, international carriers engaged primarily in the management of international telephone lines, long-distance carriers primarily engaged in the management of long-distance telephone lines, local carriers primarily engaged in the management of their own network lines restrictively installed in particular areas, and mobile carriers primarily engaged in the management of the communication facilities used by mobile stations, including cellular phones.

In the present embodiment, modes of connection between two carriers can be classified into two types. The first connection mode comprises a service provider that directly provides a communication service to a communication user and bills the communication user for a communication charge and a facility provider that provides its own network facilities to another carrier and bills the carrier for a charge of its facilities. The second connection mode comprises a plurality of facility providers connected to each other.

In the present embodiment, a set of modes of connections between two carriers involved in one communication will be referred as a "provider model". Each mode of connection in the provider model will be referred as a "plane". And only one carrier corresponds to a service provider in one communication, as a rule.

Figure 10:
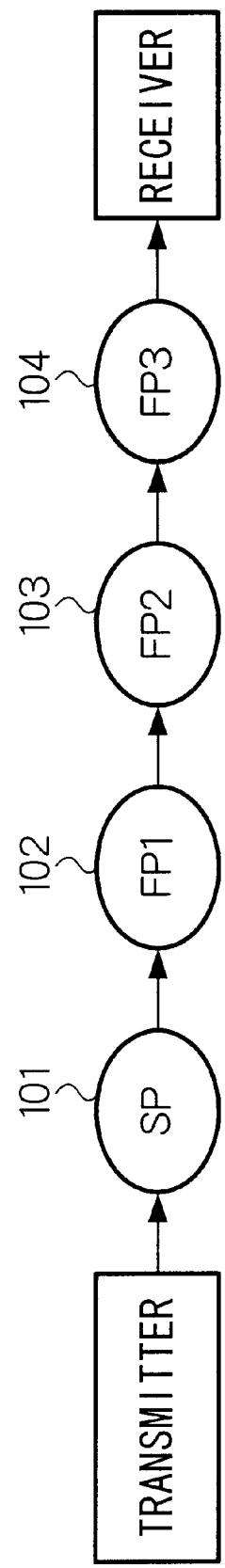
FIG. 10 is a diagram showing an example of multi-stage connection in the communication effected through communication facilities of a plurality of carriers in the aforesaid embodiment.

A method for breaking down into planes will be specifically explained with reference to FIG. 10 through FIG. 12. FIG. 10 illustrates a state wherein communication is effected from a transmitter to a receiver through communication facilities of four carriers.

First, a service provider (SP) 101 is determined and the remaining carriers are assigned as facility providers (FP) 102, 103, and 104, on the basis of type of each carrier. Then, a provider model for the communication is determined in view of type of each carrier and whether each carrier is a service provider or a facility provider. In this example, for example, the provider model shown in FIG. 11 or the provider model shown in FIG. 12 is determined depending upon type of each carrier.

Figure 11:
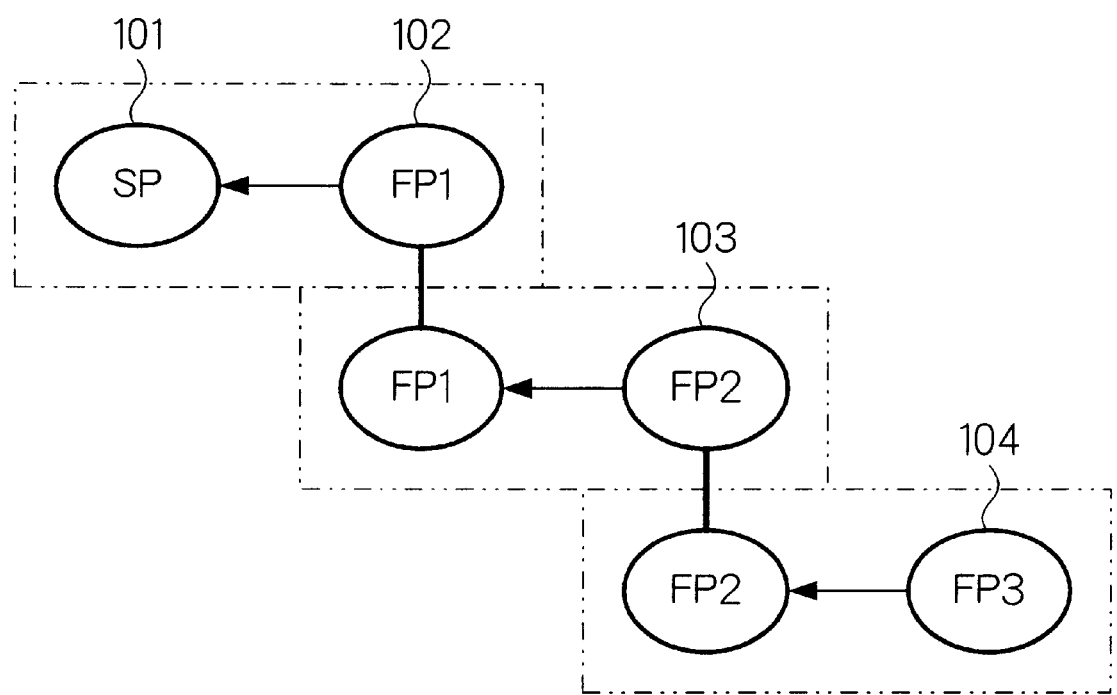
FIG. 11 is a diagram showing an example of a provider model in the aforesaid embodiment.

The provider model shown in FIG. 11 shows a relationship in which a facility provider 102 is entitled to charge a service provider 101 for a communication charge, a facility provider 103 is entitled to charge the facility provider 102 for a communication charge, and a facility provider 104 is entitled to charge the facility provider 103 for a communication charge.

Figure 12:
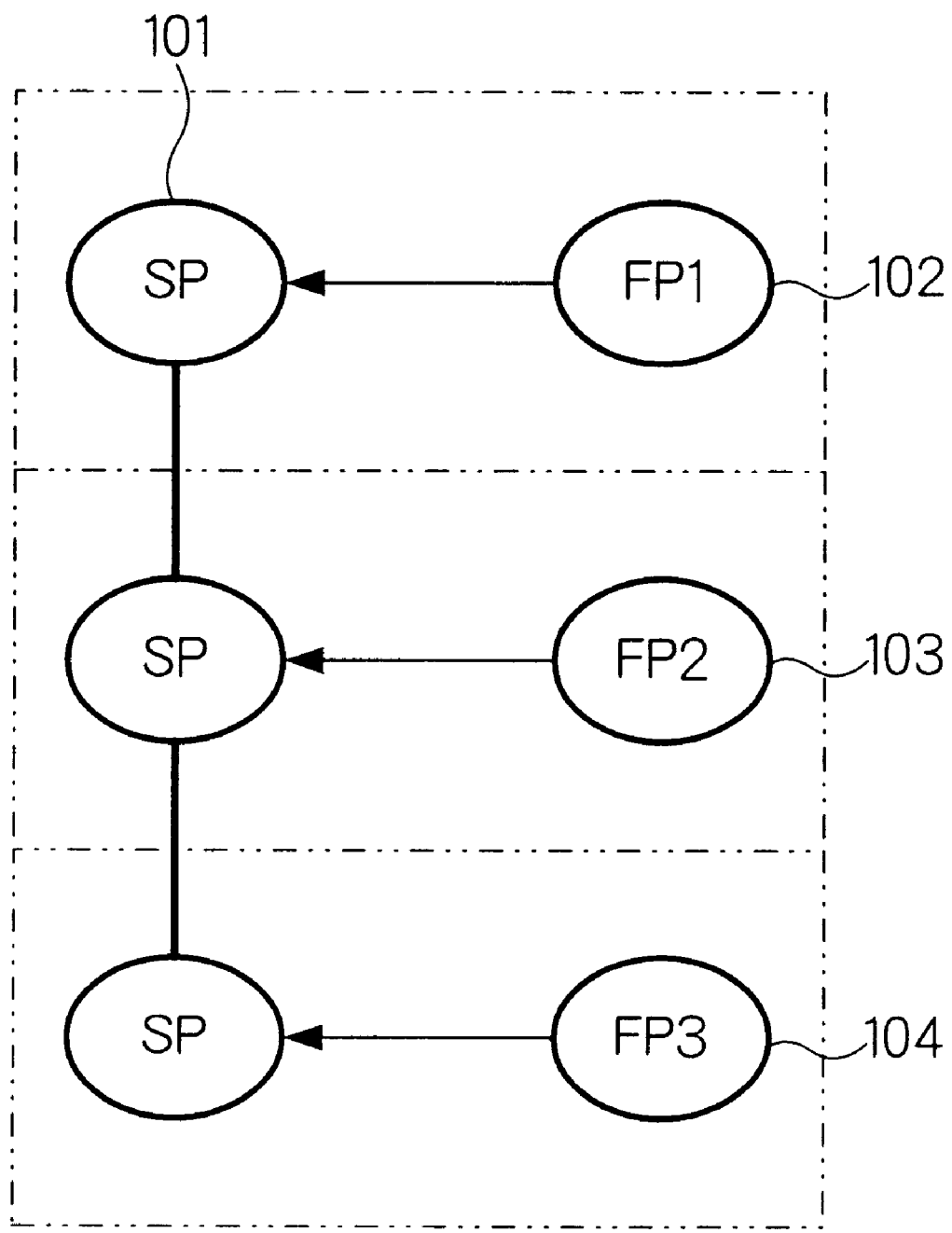
FIG. 12 is a diagram showing an example of a provider model in the aforesaid embodiment.

The provider model shown in FIG. 12 illustrates a relationship in which the facility providers 102, 103, and 104 are entitled to charge the service provider 101 for communication charges.

Thus, an entire picture of the interconnection of a plurality of carriers can be clearly understood by determining a provider model. Furthermore, charging relationships for charging communication charges or charged relationships charged for the communication charge generated between the carriers can be easily discriminated by breaking a provider model into planes.

Next, communication charges are calculated on the basis of each break-downed plane in a communication charge calculating apparatus. These calculations need to be performed on the basis of settlement items arbitrarily adopted by each carrier and of setting details of each settlement item.

Such settlement items include, for example, a settlement item for changing a communication rate depending upon a call-length, a settlement item for changing a communication rate depending upon call-distance, and an settlement item for changing a communication rate depending upon the day of the week.

The communication charge calculating apparatus handles each settlement item, to be differently set by each carrier, as an independent module for each settlement item (hereinafter referred as a "charge calculation module"), and stores the modules separately from a calculation program. Then, a communication charge is calculated on the basis of the settlement items of the carrier and the setting details of the settlement items by reading out the stored charge calculation module for a carrier charging a communication charge, when a communication charge is calculated on the basis of each break downed plane.

[1.2] Schematic Configuration of the Communication Charge Calculating Apparatus

Figure 1:
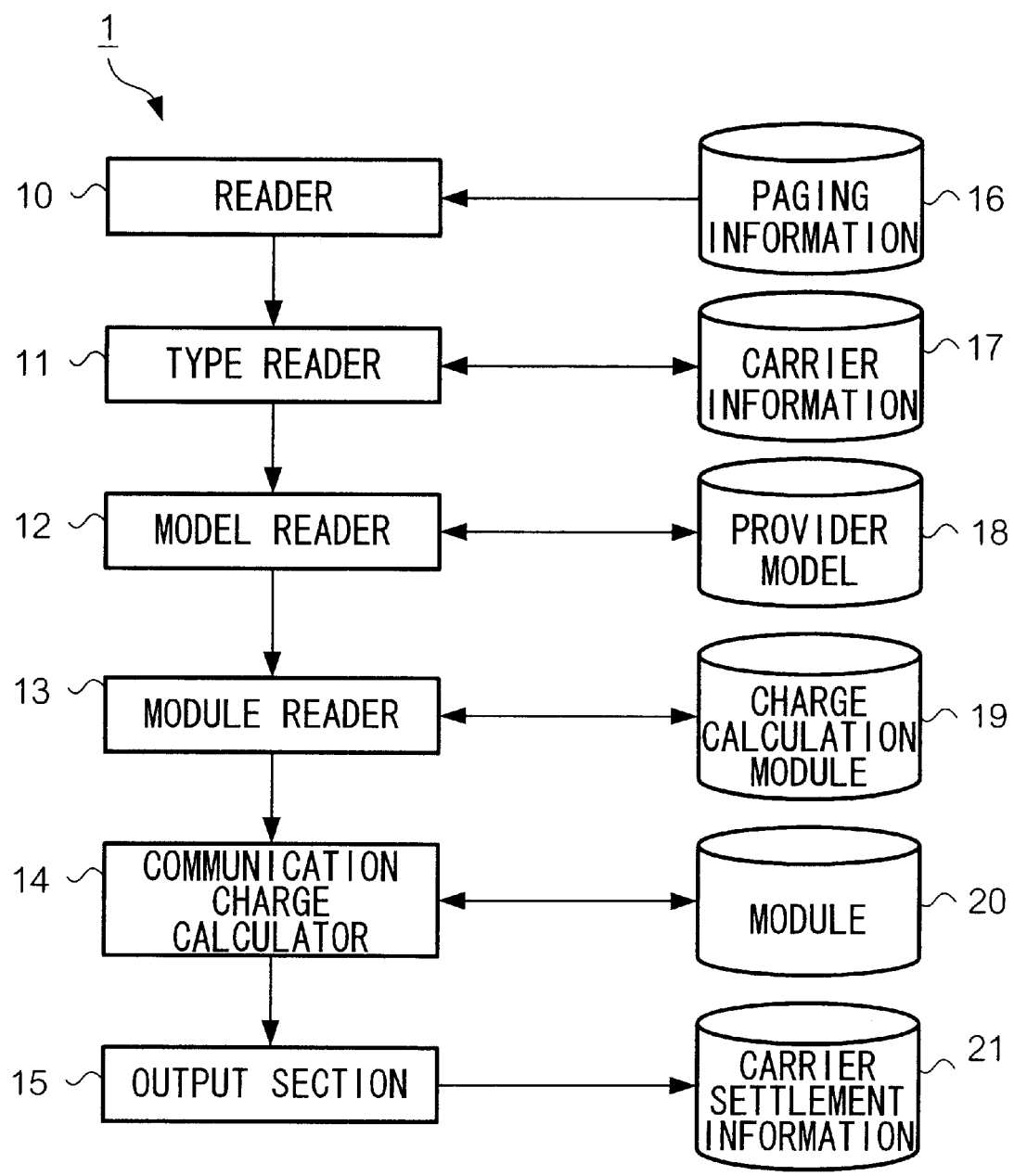
FIG. 1 is a diagram showing a schematic configuration of a communication charge calculating apparatus according to an embodiment of the present invention.

FIG. 1 shows a schematic configuration of a communication charge calculating apparatus 1, which is an embodiment of the present invention.

As shown in FIG. 1, the communication charge calculating apparatus 1 comprises a paging information file 16 for storing paging information generated in communication, a reader 10 for reading out the paging information from the paging information file 16, a carrier information file 17 for storing information relating carriers, and a type reader 11 for reading out types-information of carriers from the carrier information file 17. Furthermore, the communication charge calculating apparatus 1 comprises a provider model file 18 for storing a type string, in which the types of carriers connected during a communication are arranged in the connection mode from a transmitter to a receiver, and provider models determined on the basis of the type string, a model reader 12 for reading out provider models from the provider model file 18, a charge calculation module file 19 for storing the modules of programs related to the calculation of communication charges for each of the planes as charge calculation modules, and a module reader 13 for reading out charge calculation modules from the charge calculation module file 19. Furthermore, the communication charge calculating apparatus 1 comprises a module file 20 for storing information about the charge calculation modules, a communication charge calculator 14 for calculating communication charges generated for each paging, a carrier settlement information file 21 storing the information about settlement among carriers, and an output section 15 for outputting the information about the settlement among carriers calculated by the communication charge calculator 14 to the carrier settlement information file 21.

[1.3] File Configuration of the Communication Charge Calculating Apparatus

[1.3.1] Paging Information File

The file configuration of the paging information file 16 will be explained with reference to FIG. 2.

Figure 2:
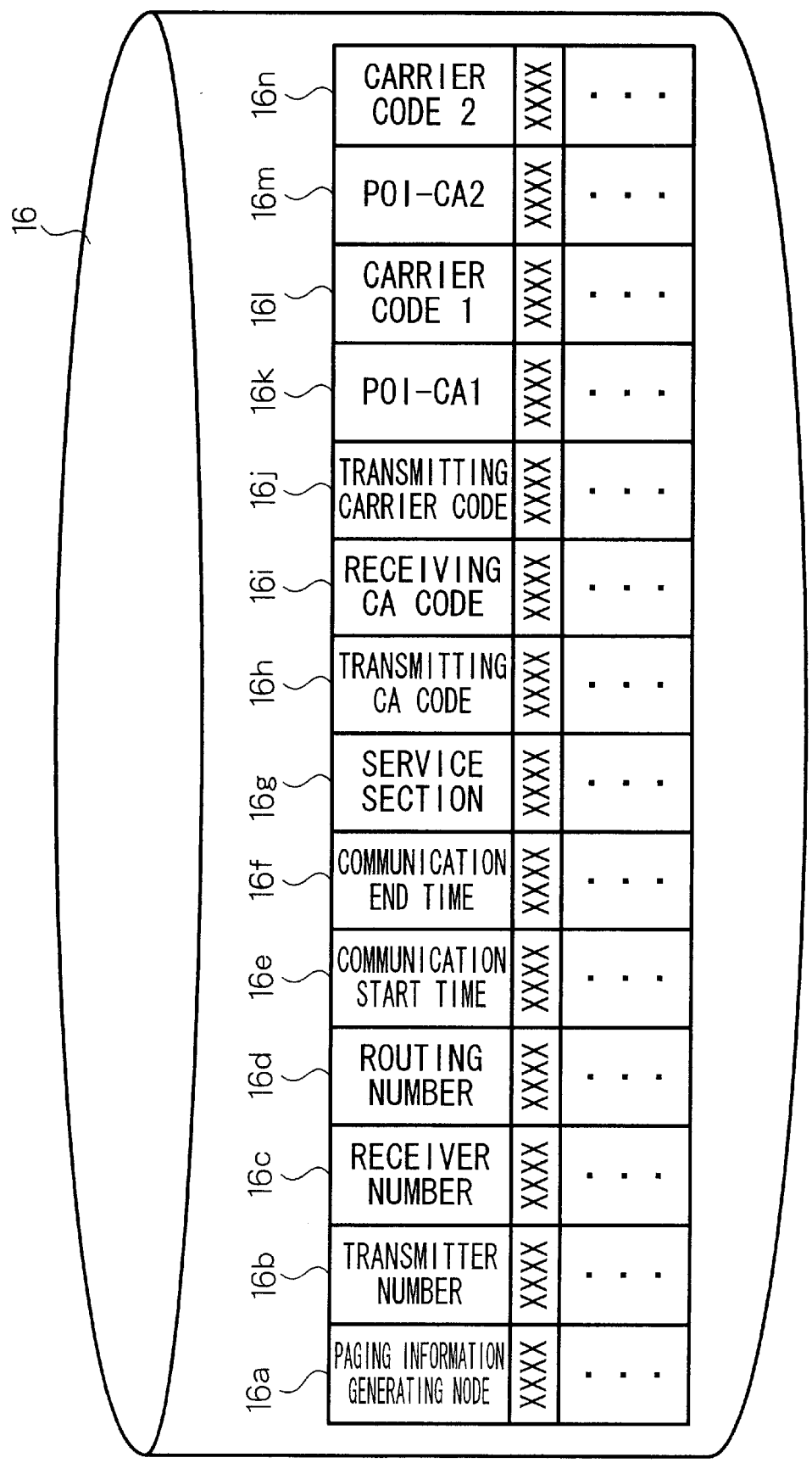
FIG. 2 is a diagram showing a file configuration of a paging information file shown in FIG. 1.

As shown in FIG. 2, a paging information file 16 is consisted of a paging information record including, for example, a paging information generating node 16a for storing an exchange number that has generated paging information, a transmitter number 16b for storing the identification number of a transmitter, a receiver number 16c for storing the identification number of a receiver, a routing number 16d for storing the number of a receiving point in a network, a communication start time 16e for storing the time when communication starts, a communication end time 16f for storing the time when the communication ends, a service classification 16g for storing the codes for identifying the services during communication, a transmitter CA code 16h for storing the charge area information about a transmitter, a receiving CA code 16i for storing the charge area information about a receiver, a transmitting carrier code 16j for storing the codes for identifying transmitting carriers, a first POI-CA 16k for storing a boundary connection point between a transmitting carrier and a first connected carrier who is the second connected carrier from the transmitter, a first carrier code 16l for storing the code for identifying the first connected carrier who is the second connected carrier from the transmitter, a second POI-CA 16m for storing a boundary connecting point between a transmitting carrier and a second connected carrier who is the third connected carrier from the transmitter, and a second carrier code 16n for storing the code for identifying a second connected carrier who is the third connected carrier from the transmitter.

When the number of connected carriers increases because of interconnection through communication facilities of a plurality of carriers (hereinafter referred as "multi-stage connection"), the number of the combinations of POI-CAs and carrier codes, e.g., a combination of the second POI-CA 16m and the second carrier code 16n, increases by the increased number of connected carriers.

[1.3.2] Carrier Information File

The file configuration of the carrier information file 17 will be explained with reference to FIG. 3.

Figure 3:
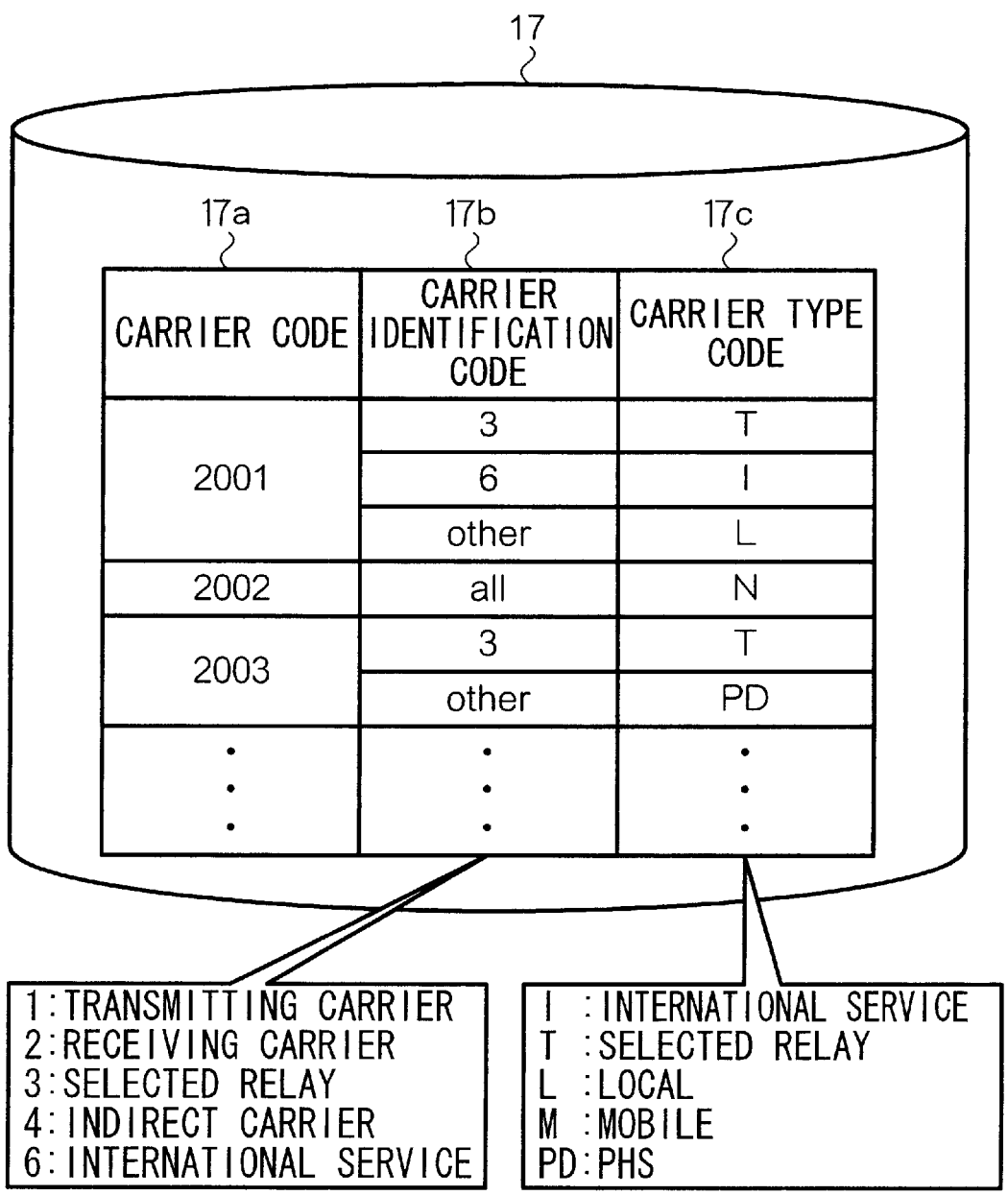
FIG. 3 is a diagram showing a file configuration of a carrier information file shown in FIG. 1.

As shown in FIG. 3, the carrier information file 17 is consisted of a carrier information record including, for example, a carrier code 17a for storing codes identifying carriers, a carrier identification code 17b for storing code information for identifying carriers by the facilities provided by the carriers, and a carrier code 17c for storing the code information for indicating the types of carriers defined by the carrier code 17a and the carrier identification code 17b.

The contents of the code information stored in the carrier identification code 17b shown in FIG. 3 are such that, for example, "1" denotes a transmitting carrier, "2" denotes a receiving carrier, "3" denotes a selected relay carrier, "4" denotes an indirect carrier, and "6" denotes an international service carrier.

The contents of the code information stored in the carrier code 17c shown in FIG. 3 are such that, for example, "N" denotes a carrier to whom a communication charge is calculated by the communication charge calculating apparatus 1, "I" denotes an international service carrier, "T" denotes a selected relay carrier, "L" denotes a local carrier, "M" denotes a mobile carrier, and "PD" denotes a PHS carrier.

[1.3.3] Provider Model File

The file configuration of the provider model file 18 will be explained with reference to FIG. 4.

Figure 4:
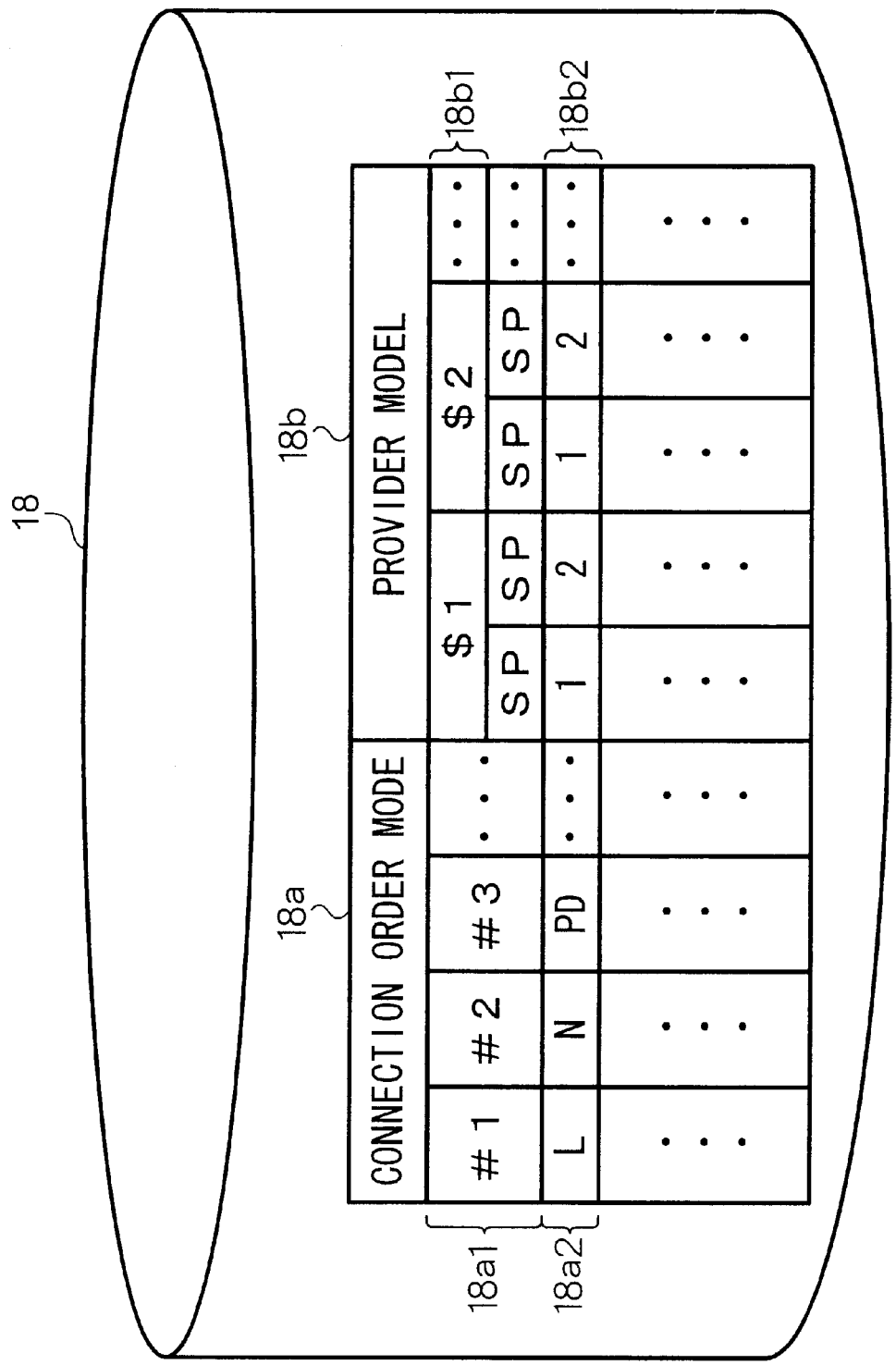
FIG. 4 is a diagram showing a file configuration of a provider model file shown in FIG. 1.

As shown in FIG. 4, the provider model file 18 is consisted of a provider model record including, for example, a connection order mode 18a for storing an information string in which the types of carriers connected in the multi-stage connection are arranged in the connection order during the multi-stage connection, and a provider model 18b for storing provider models that provide the information showing the combinations of carriers generating communication charge settlement in the connection order mode 18a.

The connection order mode 18a has storage areas distinguished by the connection order during the multi-stage connection, "#1", "#2", and "#3" shown at 18a1 in FIG. 4. "L", "N", and "PD" are stored in the storage areas, respectively as indicated at 18a2 of FIG. 4. This indicates that the connection order mode 18a is consisted of a transmitting carrier whose type is "L", a carrier whose type is "N" and who is connected at the second place from the transmitter and a receiving carrier whose type is "PD".

The provider model 18b has a storage area for storing planes, which are the combinations of charging carriers who charge communication charges generated for each connection order mode 18a, as indicated by "$1" and "$2" shown at 18b1 in FIG. 4, and charged carriers who are charged with communication charges. Then the information indicating the connection mode between two carriers and indicating the carriers corresponding to a service provider and a facility or the information indicating the carriers corresponding to a facility provider and a facility provider is stored in the storage area where the planes are stored.

To be more specific, the provider model 18b is consisted of a plane denoted by "$1" and a plane denoted by "$2", as indicated at 18b2 in FIG. 4. In this example, the information about the carrier of type "L" stored at "#1" place of the connection order mode 18a as a service provider, as well as the information about the carrier of type "N" stored at "#2" place of the connection order mode 18a as a facility provider are stored in the plane "$1."

[1.3.4] Charge Calculation Module File

The file configuration of the charge calculation module file 19 will be explained with reference to FIG. 5.

Figure 5:
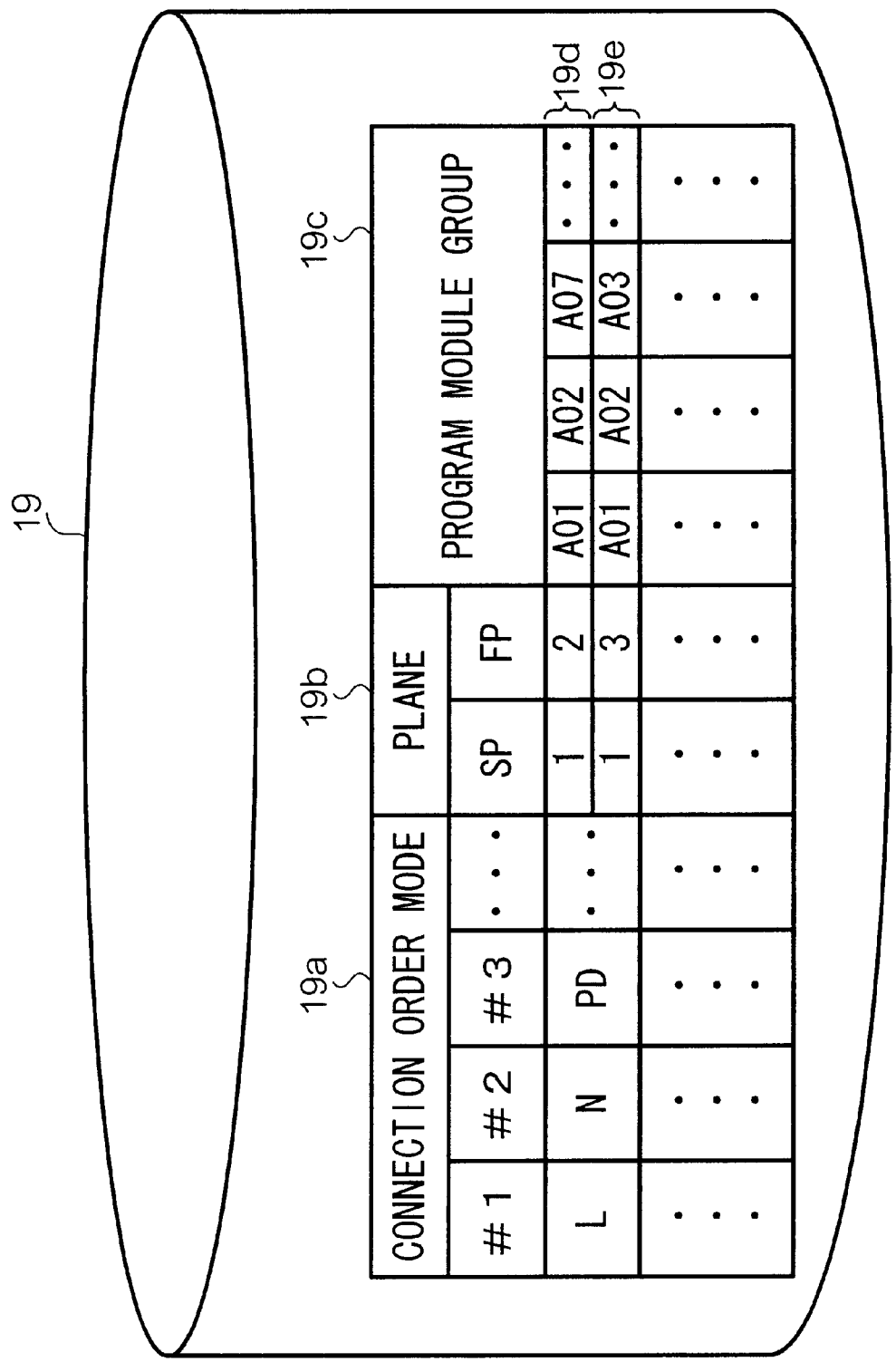
FIG. 5 is a diagram showing a file configuration of a charge calculation module file shown in FIG. 1.

As shown in FIG. 5, the charge calculation module file 19 is consisted of a charge calculation module record including, for example, a connection order mode 19a for storing an information string in which the types of carriers connected in multi-stage connection are arranged in the connection mode in the multi-stage connection, a plane 19b for storing the planes generated in the connection order mode 19a, and a program module 19c for storing the connection order mode 19a and the module numbers of charge calculation modules necessary for individual planes 19b generated in the connection order mode 19a.

The connection order mode 19a is constructed in the same manner as the connection order mode 18a of the provider model file 18.

The program module 19c is constructed so as to be able to store a plurality of module numbers.

[1.3.5] Module File

The file construction of a module file 20 will be explained with reference to FIG. 6.

As shown in FIG. 6, the module file 20 is consisted of a module record including, for example, a module number 20a for storing the numbers for identifying charge calculation modules, a module name 20b for storing names that provide simplified descriptions of the charge calculation modules, and a module 20c for storing the charge calculation module.

[1.3.6] Carrier Settlement Information File

The file configuration of a carrier settlement information file 21 will be explained with reference to FIG. 7.

As shown in FIG. 7, the carrier settlement information file 21 is consisted of a carrier settlement information record including, for example, a carrier identification code 21a for storing the codes indicating carriers involved in settlement, a connection pattern 21b for storing the information for identifying the descriptions of provider models obtained by breakdown, a charging/inquiring discriminator 21c for storing the information indicating the discriminator whether the settlement to the carrier involved in the settlement is charging or inquiring, a transmitting/receiving classification 21d for storing the classification indicating whether client carriers are transmitting or receiving in the communication, an settlement service classification 21e for storing the classification of services to be settled (e.g., analog communication or digital communication), a service classification 21f for storing the classification for identifying the service of the communication, an inside/outside ZA discriminator 21g for storing the information for discriminating whether settlement sections are inside or outside a Zone Area, an inside/outside GA discriminator 21h for storing the information for discriminating whether settlement sections are inside or outside a Group Area, a POI code 21i for storing POI (point of interface) codes for a communication to be settled, a CA code 21j for storing charge area codes for a communication to be settled, a distance step 21k for storing the information indicating the distances of settlement sections for which settlement is to be made, a number of communications 21l for storing the number of communications, a communication time 21m for storing the time of the communication, and a call units 21n for storing the units of the call.

[1.4] Hardware Configuration of the Communication Charge Calculating Apparatus

The hardware configuration of the communication charge calculating apparatus 1 will be explained with reference to FIG. 8.

Figure 8:
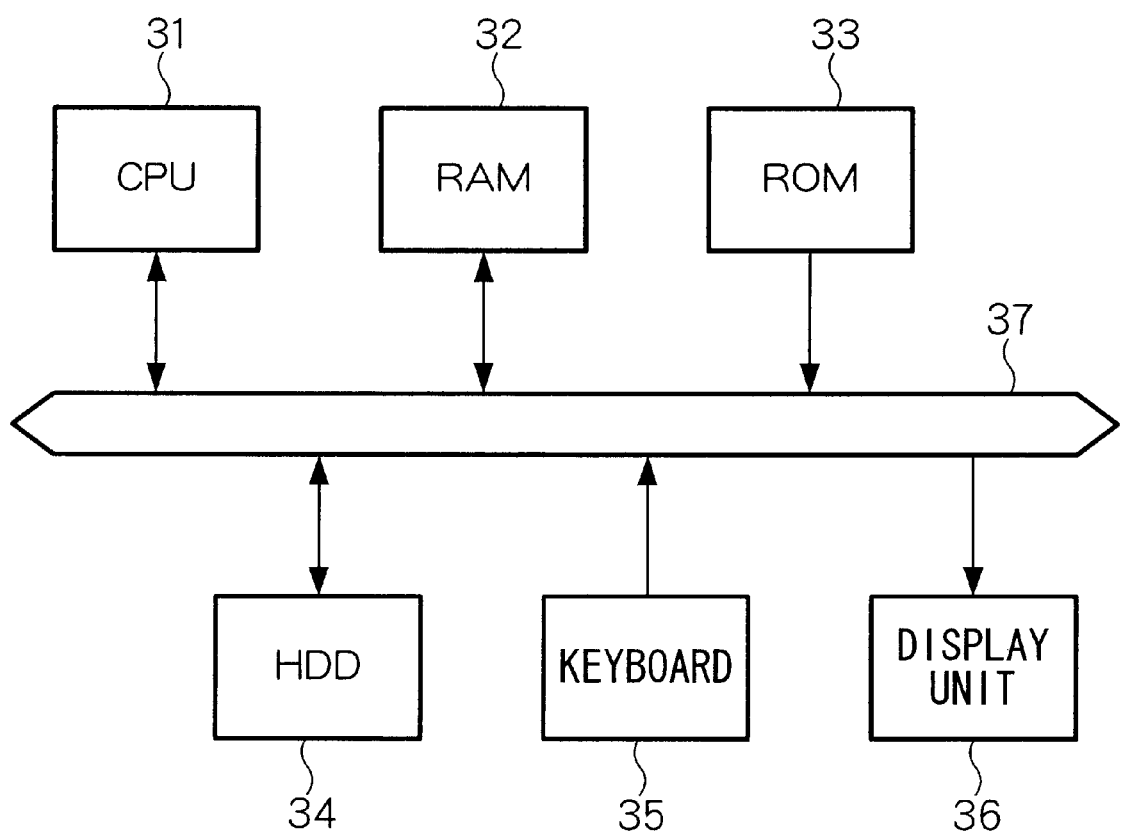
FIG. 8 is a diagram showing a hardware configuration of the communication charge calculating apparatus.

As shown in FIG. 8, the communication charge calculating apparatus 1 comprises a central processing unit (CPU) 31 for integrally carrying out computing processing and control processing, a read-only memory (ROM) 33 for storing various types of controlling programs, a main memory (RAM) 32 for temporarily storing a running program and data, an auxiliary storage unit (HDD) 34 for storing programs that control the reader 10, the type reader 11, the model reader 12, the module reader 13, the communication charge calculator 14, and the output section 17 mentioned above, a keyboard 35 for inputting various types of data, and a display unit 36 for displaying results of processing. The CPU 31, the RAM 32, the ROM 33, the HDD 34, the keyboard 35, and the display unit 36 are interconnected through a bus (BUS) 37.

To be more specific, the CPU 31 reads, for example, the program for controlling such as the reader 10, the data necessary for the control and the like stored in the HDD 34 and stores them in the RAM 32, when a command or the like for starting a job for processing communication charge calculation is inputted through the keyboard 35, Then, the CPU 31 reads the paging information, which is the input data, processes the communication charge calculation, and outputs the settlement information among carriers, which is the output data, to the carrier settlement information file 21 stored in the HDD 34, according to the program, stored in the RAM 32, for controlling such as the reader 10.

[2] Operation of the Embodiment

[2.1] Outlined Operation of the Communication Charge Calculating Apparatus

Figure 9:
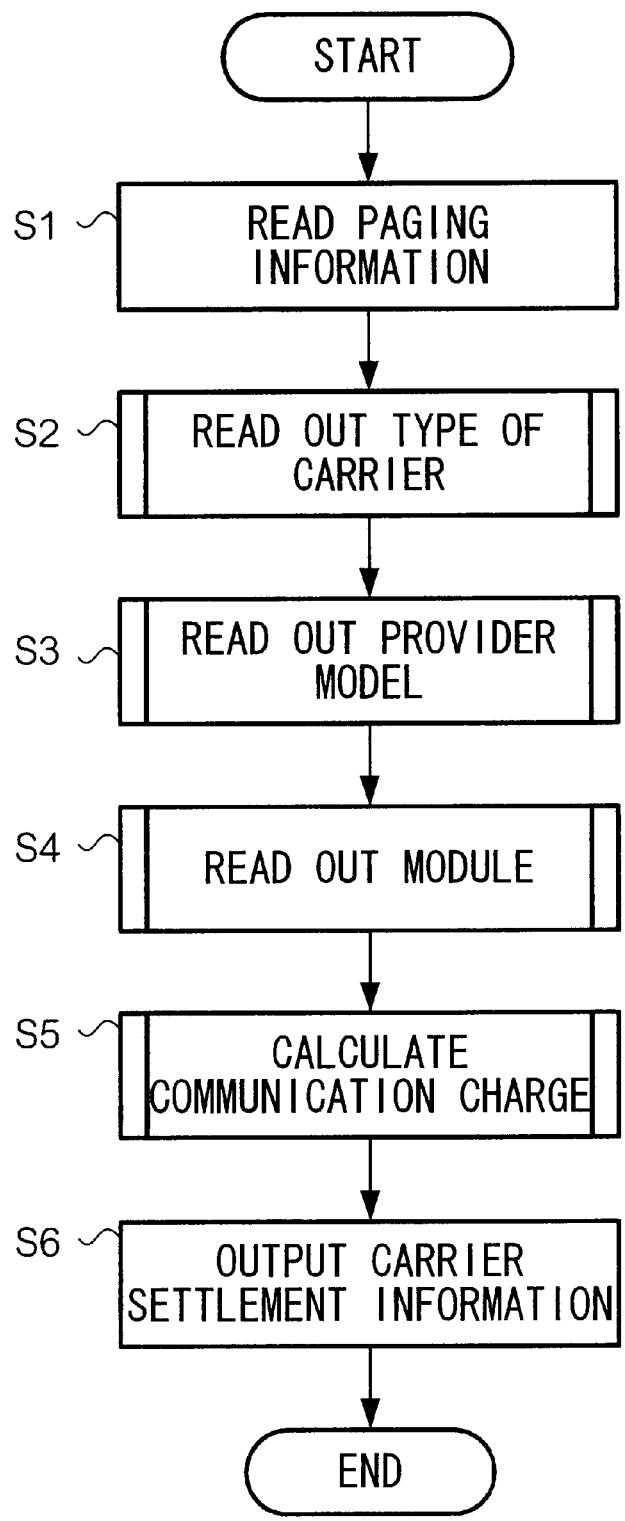
FIG. 9 is a diagram showing an example of the operation of the communication charge calculating apparatus.

Referring to FIG. 9, an exemplary operation performed in the communication charge calculating apparatus 1 to calculate communication charges generated among carriers will be described.

First, the reader 10 reads in one paging information record from the paging information file 16 (step S1).

Then, the type reader 11 searches for the carrier code 17a and the carrier identification code 17b in the carrier information file 17 by using, as the keys, the transmitting carrier code 16j and the carrier code stored in the first carrier code 16l or the second carrier code 16n, included in the paging information record read in by the reader 10, and the carrier identification code. Then, the type reader 11 processes the carrier type read-out processing for reading out the type stored in the carrier code 17c of the carrier information record detected as a result of the search (step S2). The specific operation of the carrier type read-out processing will be discussed hereinafter.

Next, the model reader 12 searches for the connection order mode 18a in the provider model file 18 by using the connection order information, as the key, generated by rearranging the types read out by the type reader 11 in the connection order from the transmitter on the basis of the information included in the paging information record about the connection. Then, the model reader 12 processes the provider read-out processing for reading out the provider model stored in the provider model 18b of the provider model record detected as a result of the search (step S3). The specific operation of the provider read-out processing will be discussed hereinafter.

Next, the module reader 13 searches for the connection order mode 19a and the plane 19b of the charge calculation module file 19 by using, as the keys, the aforesaid connection order information and the plane information stored in the provider model 18b read by the model reader 12. Then, the module reader 13 processes the module read-out processing for reading out the module number stored in a program module group 19c of the charge calculation module record detected as a result of the search (step S4). The specific operation of the module read-out processing will be discussed hereinafter.

Next, the communication charge calculator 14 searches the module number 20a of the module file 20 by using the module number, as the key, read out by the module reader 13. Then, the communication charge calculator 14 processes the communication charge calculation processing for calculating the communication charge on the basis of the module 20c detected as a result of the search (step S5). The specific operation of the communication charge calculation processing will be discussed hereinafter.

Finally, the output section 15 outputs the information about the communication charge calculated by the communication charge calculator 14 to the carrier settlement information file 21 (step S6).

[2.2] Specific Operation of the Communication Charge Calculating Apparatus

[2.2.1] Specific Operation of the Carrier Type Read-out Processing

Referring to FIG. 3, the carrier type read-out processing mentioned above will be specifically explained.

In this exemplary operation, it is assumed, for example, that in the paging information record read by the reader 10 the transmitting carrier code 16j is "2001", the first carrier code 16l is "2002", and the second carrier code 16n is "2003."

First, the carrier type read-out processing for a carrier whose transmitting carrier code 16j is "2001" will be described. In this case, the type reader 11 sets the carrier code as "2001", which provides the key for searching in the carrier information file 17, and sets the carrier identification code as "1", which denotes a transmitting carrier. The type reader 11 searches for the carrier code 17a and the carrier identification code 17b in the carrier information file 17 on the basis of the search key. Then, the type reader 11 detects type "L" for the carrier code 17c as shown in FIG. 3, which denotes a local carrier.

The carrier type read-out processing for a carrier whose first carrier code 16l is "2002" will now be described. In this case, the type reader 11 sets the carrier code as "2002", which provides the key for searching in the carrier information file 17, and sets the carrier identification code as "4", which denotes an indirect carrier. The type reader 11 searches for the carrier code 17a and the carrier identification code 17b in the carrier information file 17 on the basis of the search key. The type reader 11 detects type "N" for the carrier code 17c as shown in FIG. 3, which denotes a carrier for which a communication charge is to be calculated.

The carrier type read-out processing for a carrier whose second carrier code 16n is "2003" will now be described. In this case, the type reader 11 sets the carrier code as "2003", which provides the key for searching in the carrier information file 17, and sets the carrier identification code as "2", which denotes the receiving carrier. The type reader 11 searches for the carrier code 17a and the carrier identification code 17b in the carrier information file 17 on the basis of the search key. The type reader 11 detects type "PD" for the carrier code 17c as shown in FIG. 3, which denotes a PHS carrier.

[2.2.2] Specific Operation of the Provider Read-out Processing

Referring to FIG. 4, the provider read-out processing mentioned above will be specifically described.

In this exemplary operation, it is assumed, for example, that the types read out by the type reader 11 on the basis of the paging information record read in by the reader 10 are "L", "N", and "PD" in the connection order from the transmitter.

The model reader 12 sets the connection order information as "LNPD", which provides the key for searching in the provider model file 18. The model reader 12 searches for the connection order mode 18a in the provider model file 18 on the basis of the search key. The model reader 12 detects, as the provider model 18b, the planes stored at "$1" and "$2" as shown in FIG. 4.

The plane stored at "$1" indicates that the service provider (SP) corresponds to the carrier of type "L" whose connection order is "1", and that the facility provider (FP) corresponds to the carrier of type "N" whose connection order is "2". Hence, in this case, the carrier of type "N" charges the carrier of type "L" for a communication charge including a line charge. Meanwhile, the plane stored at "$2" indicates that the service provider corresponds to the carrier of type "L" whose connection order is "1", and the facility provider corresponds to that the carrier of type "PD" whose connection order is "3". Hence, in this case, the carrier of type "PD" charges the carrier of type "L" for a communication charge including a line charge.

[2.2.3] Specific Operation of the Module Read-out Processing

Referring to FIG. 5, the module read-out processing mentioned above will be specifically described.

In this exemplary operation, it is assumed, for example, that the types read out by the type reader 11 on the basis of the paging information record read in by the reader 10 are "L", "N", and "PD" in the connection order from the transmitter.

First, the descriptions will be given of the module read-out processing for interconnection between carriers in a case where the service provider (SP) is a carrier of type "L", and the facility provider (FP) is a carrier of type "N." In this case, the model reader 13 sets the connection order information as "LNPD", which provides the key for searching in the charge calculation module file 19, and sets the service provider as "1" and the facility provider as "2" in the plane information. The module reader 13 searches for the connection order mode 19a and the plane 19b in the charge calculation module file 19 on the basis of the search key. Then the module reader 13 detects the program module group 19c that includes module numbers "A01,""A02," and "A07" as shown at 19d in FIG. 5.

Next, the descriptions will now be given of the module read-out processing for interconnection between carriers in a case where the service provider (SP) is a carrier of type "L", and the facility provider (FP) is a carrier of type "PD." In this case, the model reader 13 sets the connection order information as "LNPD", which provides the key for searching in the charge calculation module file 19, and sets the service provider as "1" and the facility provider as "3" in the plane information. The module reader 13 searches for the connection order mode 19a and the plane 19b in the charge calculation module file 19 on the basis of the search key. Then, the module reader 13 detects the program module group 19c that includes module numbers "A01,""A02," and "A03" as indicated at 19e in FIG. 5.

The module reader 13 temporarily stores an execution control table in an execution control file after detecting the program module group 19c, wherein the execution control table stores the planes of the provider model and stores the program module group 19c detected on the basis of the planes associated with the planes, and the execution control file is a temporary storage file.

[2.2.4] Specific Operation of the Communication Charge Calculation Processing

Referring to FIG. 6, the communication charge calculation processing mentioned above will be specifically described.

In this exemplary operation, it is assumed, for example, that the types read out by the type reader 11 on the basis of the paging information record inputted by the reader 10 are "L," "N," and "PD" in the connection order from the transmitter.

The descriptions will be given of the communication charge calculation processing for interconnection between carriers in a case where the service provider (SP) is a carrier of type "L", and the facility provider (FP) is a carrier of type "N." In this case, the communication charge calculator 14 determines whether "A01", which is the module number indicating the setting of the transmitting/receiving classification, is included in the program module group 19c stored in the execution control table created by the module reader 13, when the communication charge calculator 14 carries out the processing for setting the transmitting/receiving classification 21d, for example, included in the settlement item required for calculating a communication charge. Then the communication charge calculator 14 searches for the module file 20 by using the module number "A01" as the key, if the module number "A01" is included in the program module group 19c. Then, the communication charge calculator 14 carries out the processing for setting the transmitting/receiving classification according to the module 20c corresponding to "A01" included in the module record detected as a result of the search. Conversely, the communication charge calculator 14 proceeds to the next processing without carrying out the processing for setting the transmitting/receiving classification, if the module number "A01" is not included in the program module group 19c.

Next, the communication charge calculator 14 determines whether "A02", which is the module number indicating the setting of the service information, is included in the program module group 19c stored in the execution control table created by the module reader 13, when the communication charge calculator 14 carries out the processing for setting the service information, for example, included in the settlement item required for calculating a communication charge. Then, the communication charge calculator 14 searches the module file 20 by using the module number "A02" as the key, if the module number "A02" is included in the program module group 19c. Then, the communication charge calculator 14 carries out the processing for setting the service information according to the module 20c corresponding to "A02" included in the module record detected as a result of the search. Conversely, the communication charge calculator 14 proceeds to the next processing without carrying out the processing for setting the service information, if the module number "A02" is not included in the program module group 19c.

Thus, the communication charge calculator 14 carries out the processing for setting the settlement items, which have been registered in the module file 20, according to the module 20c associated with the module number registered for each connection order mode and plane.

[3] Advantages of the Embodiment

In the embodiment set forth above, the plane of a provider model can be read out by the model reader 12 for each connection order mode. Hence, even when interconnect communication is performed, it is possible to identify all carriers involved in the communication between a transmitter to a receiver, so that accurate information about the settlement generated among the carriers can be obtained.

The planes read out by the model reader 12 allow complicated connection modes to be simplified, and allow the communication charge to be calculated on the basis of individually independent connections.

The module file 20 is provided in which the conditions for setting the settlement items that differ from one carrier to another have been registered as a module 20c. This makes it possible to easily handle the complicated settlement methods that differ from one connection mode to another, and to reduce the needs for modifying the programs for carrying out the communication charge calculation processing, thus permitting improved maintainability of the programs.

[4] Modifications

[4.1] First Modification

In the embodiment described above, the settlement items set separately for each carrier are represented in terms of module units; however, they may alternatively be represented in terms of program units, such as subroutines, rather than limiting to the modules.

[4.2] Second Modification

In the embodiment described above, the provider model 18b is read out by the model reader 12, then the program module group 19c is read out by the module reader 13. Alternatively, however, the provider model 18b and the program module group 19c may be read out by the module reader 13, omitting the model reader 12.

[4.3] Third Modification

In the embodiment described above, the charge calculation modules are stored in the module file 20; however, the modules themselves may alternatively be stored in another file. In such a case, it will be necessary to associate the files therewith by setting relationships by using the module numbers 20a or the like.

What is claimed is:

1. An apparatus for calculating communication charges between carriers from a call detail record generated as a result of a communication via a plurality of communication facilities of a plurality of carriers, the call detail record comprising a plurality of pairs of carrier code and carrier identification code, wherein the carrier code identifies a carrier, and the carrier identification code identifies a carrier based on communication facilities the carrier provides, the apparatus comprising:

a first storage section for storing a record comprising a carrier code, a carrier identification code, and a carrier type code determined from the carrier code and the carrier identification code;

a second storage section for storing a record comprising a code sequence of a plurality of carrier type codes, and a plane expressing a pair of carrier type code of a billing carrier billing communication charge and carrier type code of a billed carrier billed by the billing carrier;

a first extracting section for extracting the carrier type code from the first storage section on the basis of each of the pairs of carrier code and carrier identification code included in the call detail record;

a second extracting section for extracting the plane from the second storage section on the basis of a code sequence of the carrier type code extracted by the first extraction section; and a calculating section for calculating a communication charge between the carriers corresponding to the plane extracted by the second extracting section.

2. The apparatus of claim 1, wherein:

the call detail record further comprises a connection sequence of the communication facilities of the plurality of carriers during the communication;

the code sequence of the plurality of carrier type codes stored in the second storage section is arranged in line with the connection sequence of the communication facilities of the plurality of carriers; and the second extracting section extracts planes from the second storage section on the basis of the code sequence of the extracted carrier type code in line with the connection sequence of the communication facilities of the plurality of carriers.

3. The apparatus of claim 2, wherein the plane stored in the second storage section comprises positions for the billing carrier and the billed carrier in the connection sequence of the communication facilities of the plurality of carriers.

4. The apparatus of claim 2 or 3, wherein:
the record stored in the second storage section further comprises a program module for calculating a communication charge corresponding to the plane;
the second extracting section further extracts the program module from the second storage section on the basis of the code sequence of the carrier type code extracted by the first extraction section; and
the calculating section calculates the communication charge between the carriers by using the program module extracted by the second extracting section.

5. A method for controlling an apparatus for calculating communication charges between carriers from a call detail record generated as a result of a communication via a plurality of communication facilities of a plurality of carriers, the call detail record comprising a plurality of pairs of carrier code and carrier identification code, wherein the carrier code identifies a carrier and the carrier identification code identifies a carrier based on communication facilities the carrier provides, the apparatus comprising a first storage section for storing a record comprising a carrier code, a carrier identification code, and a carrier type code corresponding to the carrier code and the carrier identification code, a second storage section for storing a record comprising a code sequence of a plurality of carrier type codes, and a plane expressing a pair of carrier type code of a billing carrier billing communication charge and carrier type code of a billed carrier billed by the billing carrier, the method comprising:
extracting the carrier type code from the first storage section on the basis of each of the pairs of carrier code and carrier identification code included in the call detail record;
extracting the plane from the second storage section on the basis of a code sequence of the carrier type code extracted from the first storage section; and
calculating a communication charge between the carriers corresponding to the plane extracted from the second storage section.

6. The method of claim 5, wherein:
the call detail record further comprises a connection sequence of the communication facilities of the plurality of carriers during the communication;
the code sequence of the plurality of carrier type codes is stored in the second storage section in line with the connection sequence; and
the plane is extracted from the second storage section on the basis of the code sequence of the extracted carrier type code arranged in the connection sequence of the communication facilities of the plurality of carriers.

7. The method of claim 6, wherein the plane stored in the second storage section comprises positions for the billing carrier and the billed carrier in the connection sequence of the communication facilities of the plurality of carriers.

8. The method of claim 6 or 7, wherein the record stored in the second storage section further comprises a program module for calculating a communication charge corresponding to the plane, the method further comprising:
extracting the program module from the second storage section on the basis of the code sequence of the carrier type code extracted from the first storage section; and
calculating the communication charge between the carriers using the program module extracted from the second storage section.

9. A medium comprising a recorded program for controlling an apparatus for calculating communication charges between carriers from a call detail record generated as a result of a communication via a plurality of communication facilities of a plurality of carriers, the call detail record comprising a plurality of pairs of carrier code and carrier identification code, wherein the carrier code identifies a carrier and the carrier identification code identifies a carrier based on communication facilities the carrier provides, the apparatus comprising a first storage section for storing a record comprising a carrier code, a carrier identification code, and a carrier type code corresponding to a pair of the carrier code and the carrier identification code, a second storage section for storing a record comprising a code sequence of a plurality of carrier type codes, and a plane expressing a pair of carrier type code of a billing carrier billing communication charge and carrier type code of a billed carrier billed by the billing carrier, the program comprising:
extracting the carrier type code from the first storage section on the basis of each of the pairs of carrier code and carrier identification code included in the call detail record;
extracting the plane from the second storage section on the basis of a code sequence of the extracted carrier type code; and
calculating a communication charge between the carriers corresponding to the extracted plane.

10. The medium of claim 9, wherein:
the call detail record further comprises a connection sequence of the communication facilities of the plurality of carriers during the communication;
the code sequence of the plurality of carrier type codes stored in the second storage section is in line with the connection sequence; and
the plane is extracted from the second storage section on the basis of the code sequence of the extracted carrier type code arranged in the connection sequence of the communication facilities of the plurality of carriers.

11. The medium of claim 10, wherein the plane stored in the second storage section comprises positions for the billing carrier and the billed carrier in the connection sequence of the communication facilities of the plurality of carriers.

12. The medium of claim 10 or 11, wherein the record stored in the second storage section further comprises a program module for calculating a communication charge corresponding to the plane, the program further comprising:
extracting the program module from the second storage section on the basis of the code sequence of the extracted carrier type code; and
calculating the communication charge between the carriers using the extracted program module.

* * * * *